United States Patent
Yang et al.

(10) Patent No.: US 11,564,173 B2
(45) Date of Patent: Jan. 24, 2023

(54) OPEN-LOOP POWER CONTROL PARAMETER DETERMINATION FOR MIXED DOWNLINK CONTROL INFORMATION FORMATS

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/303,319

(22) Filed: May 26, 2021

(65) Prior Publication Data
US 2021/0377870 A1    Dec. 2, 2021

Related U.S. Application Data

(60) Provisional application No. 63/030,753, filed on May 27, 2020.

(51) Int. Cl.
*H04W 52/10* (2009.01)
*H04W 52/38* (2009.01)
*H04W 52/14* (2009.01)

(52) U.S. Cl.
CPC ......... *H04W 52/10* (2013.01); *H04W 52/146* (2013.01); *H04W 52/386* (2013.01)

(58) Field of Classification Search
CPC . H04W 52/10; H04W 52/146; H04W 52/386; H04W 52/281
See application file for complete search history.

(56) References Cited

U.S. PATENT DOCUMENTS

| 2011/0201341 A1* | 8/2011 | Choudhury ....... H04W 72/0426 455/450 |
| 2018/0227938 A1 | 8/2018 | Lee et al. |
| 2019/0261281 A1 | 8/2019 | Jung et al. |

(Continued)

FOREIGN PATENT DOCUMENTS

| WO | 2019201253 A1 | 10/2019 |
| WO | 2020034442 A1 | 2/2020 |
| WO | 2020092985 A1 | 5/2020 |

OTHER PUBLICATIONS

Moderator (Vivo): "Summary #2 of UL inter UE Tx prioritization", 3GPP FRAFT: R1-2004728, 3 RD Generation Partneership Project (3GPP), vol. RAN WG1, No. e-meeting; 20202525 May 25, 2020, XP051890589. (Year: 2020).*

(Continued)

*Primary Examiner* — John J Lee
(74) *Attorney, Agent, or Firm* — Harrity & Harrity, LLP

(57) ABSTRACT

Various aspects of the present disclosure generally relate to wireless communication. Some techniques and apparatuses described herein provide resolution of ambiguity with regard to determination of an open loop power control value (e.g., a P0 value) for a user equipment that is configured with at least two downlink control information formats, of which one is configured with a sounding reference signal resource indicator (SRI) field and another is not configured with an SRI field. Numerous other aspects are provided.

30 Claims, 10 Drawing Sheets

(56) References Cited

U.S. PATENT DOCUMENTS

2020/0359419 A1* 11/2020 Li ..................... H04W 52/245
2021/0160784 A1* 5/2021 Yang ................ H04W 72/1289

OTHER PUBLICATIONS

3GPP TS 38.213: "3rd Generation Partnership Project, Technical Specification Group Radio Access Network, NR, Physical Layer Procedures for Control (Release 16)", 3GPP TS 38.213, V16.1.0, Apr. 3, 2020 (Apr. 3, 2020), 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), XP051893821, pp. 1-156, Retrieved from the Internet: URL:http://ftp.3gpp.org/Specs/archive/38_series/38.213/38213-g10.zip 38213-g10.docx [retrieved on Apr. 3, 2020] p. 17, line 3—p. 18, line 8, paragraph [0010], Section 9, clauses 6, 9.2.1, 10.2 and 12.

International Search Report and Written Opinion—PCT/US2021/070618—ISA/EPO—dated Sep. 9, 2021.

Moderator (VIVO): "Summary#2 of UL Inter UE Tx Prioritization", 3GPP Draft, R1 -2004728, 3GPP TSG RAN WG1 Meeting #101-e, 3rd Generation Partnership Project (3GPP), Mobile Competence Centre, 650, Route Des Lucioles, F-06921 Sophia-Antipolis Cedex, France, vol. RAN WG1. No. e-Meeting, May 25, 2020-Jun. 5, 2020, May 25, 2020 (May 25, 2020), XP051890589, pp. 1-31, Retrieved from the Internet: URL:https://ftp.3gpp.org/tsg_ran/WG1_RL1/TSGR1_101-e/Docs/R1-2004728.zip R1-2004728 Summary#2 of UL inter UE Txprioritization.docx [retrieved on May 25, 2020] p. 16, Line 1-Line 34.

* cited by examiner

OPEN-LOOP POWER CONTROL PARAMETER DETERMINATION FOR MIXED DOWNLINK CONTROL INFORMATION FORMATS

CROSS-REFERENCE TO RELATED APPLICATION

This Patent Application claims priority to U.S. Provisional Patent Application No. 63/030,753, filed on May 27, 2020, entitled "OPEN-LOOP POWER CONTROL PARAMETER DETERMINATION FOR MIXED DOWNLINK CONTROL INFORMATION FORMATS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for open-loop power control (OLPC) parameter determination for mixed downlink control information (DCI) formats.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; determining the open loop power level from the multiple open loop power levels based at least in part on the single-bit indication field and the SRI field; and transmitting on the PUSCH using the open loop power level. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, a method of wireless communication performed by a base station includes transmitting downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; and receiving on the PUSCH transmitted with the open loop power level determined from the multiple open loop power levels based at least in part on the single-bit indication field and the power parameter. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, a user equipment (UE) for wireless communication includes a memory; and one or more processors coupled to the memory, the one or more processors configured to: receive downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; determine the open loop power level based at least in part on the single-bit indication field and the SRI field; and transmit on the PUSCH using the open loop power level. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, a base station for wireless communication includes a memory; and one or more processors coupled to the memory, the one or more processors configured to: transmit, via downlink control information (DCI), scheduling information for a physical uplink shared channel (PUSCH), wherein the scheduling information indicates an indication of an open loop power level associated with the PUSCH, wherein a DCI format of the DCI includes a single-bit indication field for the open loop power level and a sounding reference signal resource indicator (SRI) field, and wherein multiple open loop power levels are configured for a power parameter set indicated by the SRI field; and receive the PUSCH, wherein the open loop power level of the PUSCH uses a lowest-indexed power level of the multiple open loop power levels. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, a non-transitory computer-readable medium storing a set of instructions for wireless communication includes one or more instructions that, when executed by one or more processors of a user equipment (UE), cause the UE to: receive downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; determine the open loop power level from the multiple open loop power levels based at least in part on the single-bit indication field and the SRI field; and transmit on the PUSCH using the open loop power level. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, a non-transitory computer-readable medium storing a set of instructions for wireless communication includes one or more instructions that, when executed by one or more processors of a base station, cause the base station to: transmit downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; and receive on the PUSCH transmitted with the open loop power level determined from the multiple open loop power levels based at least in part on the single-bit indication field and the power parameter. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, an apparatus for wireless communication includes means for receiving downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; means for determining the open loop power level from the multiple open loop power levels based at least in part on the single-bit indication field and the SRI field; and means for transmitting on the PUSCH using the open loop power level. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, an apparatus for wireless communication includes means for transmitting downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; and means for receiving on the PUSCH transmitted with the open loop power level determined from the multiple open loop power levels based at least in part on the single-bit indication field and the power parameter. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
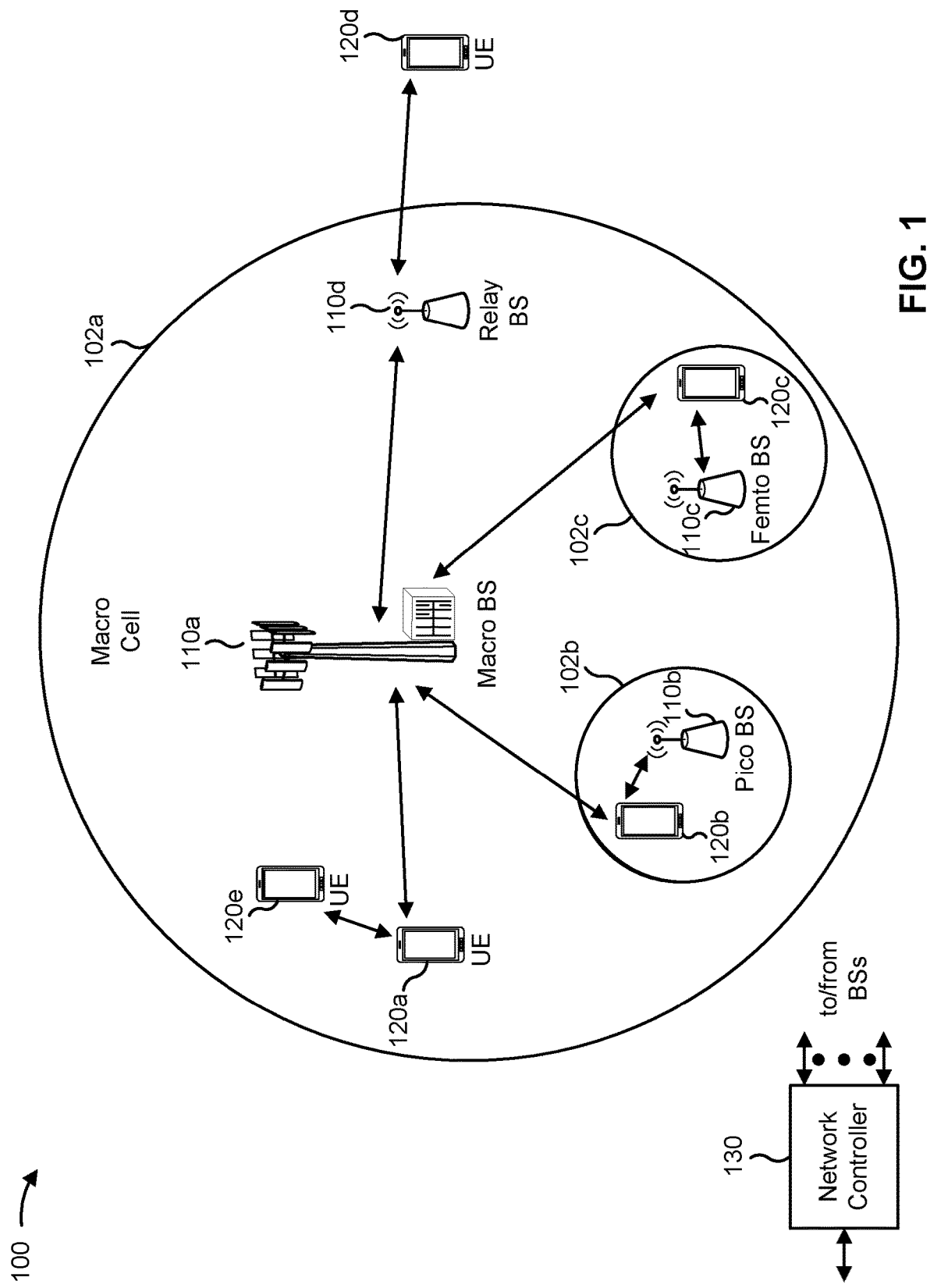
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
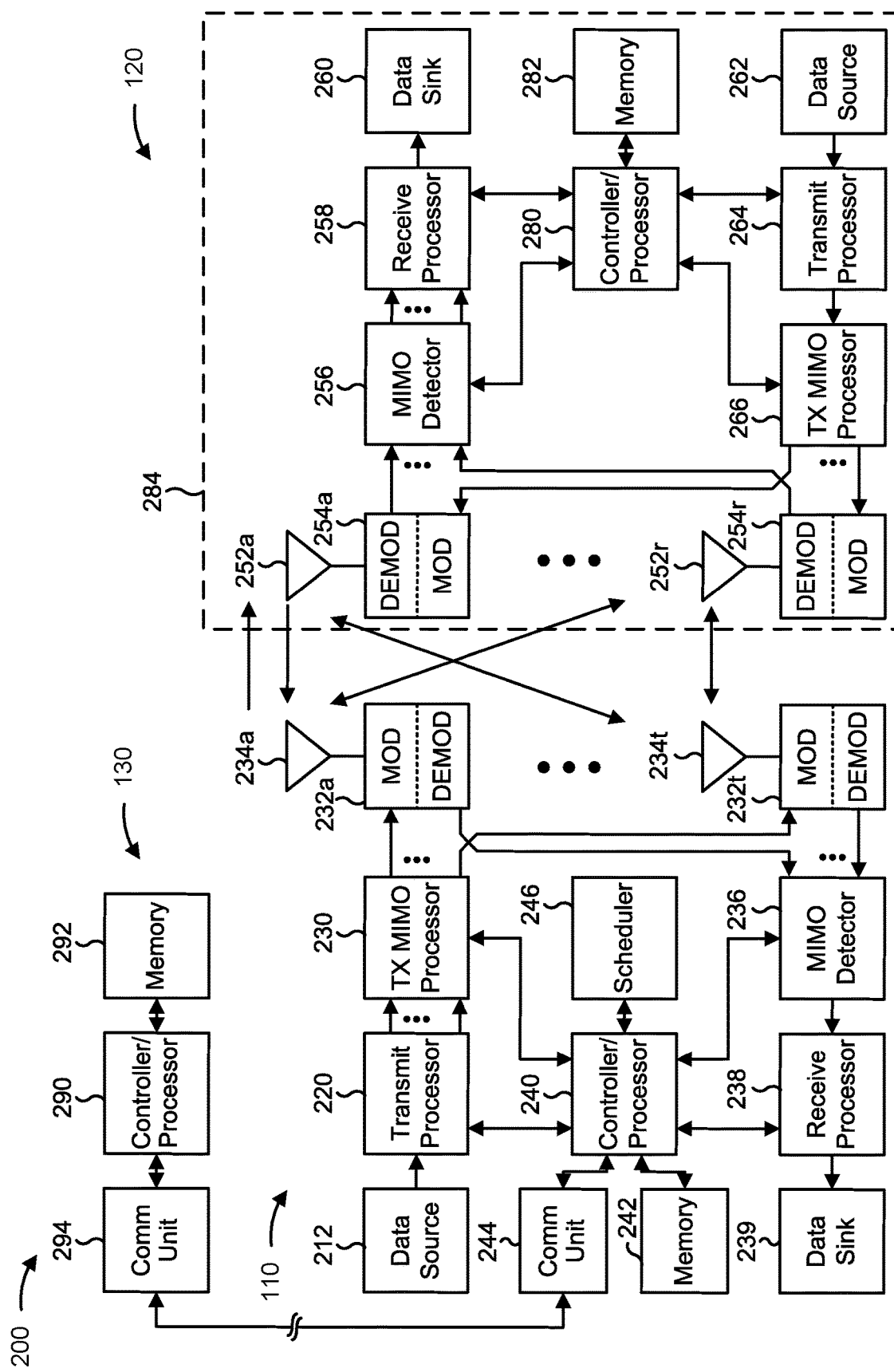
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-4.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-4.

Controller/processor 240 of base station 110, controller/processor 280 of UE 120, and/or any other component(s) of FIG. 2 may perform one or more techniques associated with open-loop power control (OLPC) parameter determination for mixed downlink control information (DCI) formats, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 500 of FIG. 5, method 800 of FIG. 8, method 900 of FIG. 9, method 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 400 of FIG. 4, method 500 of FIG. 5, method 800 of FIG. 8, method 900 of FIG. 9, method 1000 of FIG. 10, and/or other processes as described herein. In some aspects, executing instructions may include running the instructions, converting the instructions, compiling the instructions, and/or interpreting the instructions, among other examples.

In some aspects, the user equipment (UE) includes means for receiving downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; means for determining the open loop power level from the multiple open loop power levels based at least in part on the single-bit indication field and the SRI field; and/or means for transmitting on the PUSCH using the open loop power level. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282. In one example, the techniques and apparatuses described herein can be applied for ultra-reliable low latency communication. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

In some aspects, the base station includes means for transmitting downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; and/or means for receiving on the PUSCH transmitted with the open loop power level determined from the multiple open loop power levels based at least in part on the single-bit indication field and the power parameter. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In one example, the techniques and apparatuses described herein can be applied for ultra-reliable low latency communication. In some aspects, the UE may determine the open loop power level based at least in part on the one-bit indication and the SRI. For example, the determination of the open loop power level may be based at least in part on a preconfigured rule for resolving the ambiguity. More particularly, the rule may indicate to use a lowest-indexed open loop power level of the power parameter set.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

OLPC is a technique used by a UE to control transmission power of the UE. In OLPC, the UE may perform power control without feedback from a base station. For example, the UE may receive a reference signal, estimate a signal strength of the reference signal, and adjust a transmit power of the UE based at least in part on the signal strength and a configuration of the UE. OLPC can be contrasted with closed-loop power control, in which the UE adjusts transmit power in accordance with a command received from a base station indicating to increase or decrease the transmit power.

5G/NR may support dynamic multiplexing of traffic associated with different services. For example, 5G/NR may support dynamic multiplexing of traffic associated with different priorities or quality of service identifiers, such as ultra-reliable low latency communication (URLLC) traffic and enhanced mobile broadband (eMBB) traffic. Dynamic multiplexing may include scheduling an urgent transmission (e.g., associated with a URLLC service) of a first UE on a resource that overlaps with a non-urgent transmission (e.g., associated with an eMBB service) of a second UE. In such a case, the BS may indicate, to the first UE, to boost transmit power for the urgent transmission in order to combat interference from the non-urgent transmission.

The transmit power levels for the boosted and non-boosted transmissions may be defined using OLPC power levels. An OLPC power level is a value that indicates a transmit power for an OLPC operation associated with a given service, such as a nominal UE transmit power. For example, an OLPC power level indicating a base transmit power for eMBB services may be referred to herein as $P_0^{EMBB}$, an OLPC power level indicating a base transmit power for URLLC services may be referred to herein as $P_0^{URLLC}$, and an OLPC power level indicating a boosted transmit power for URLLC services (e.g., for a URLLC transmission that overlaps with a resource for an eMBB transmission) may be referred to herein as $P_0^{URLLC,boost}$. "eMBB service" may refer to a service associated with low priority traffic and "URLLC service" may refer to a service associated with high priority traffic. For example, an eMBB service may be associated with a lower priority index than a URLLC service. A base station may dynamically indicate the above OLPC power levels in an uplink grant for the corresponding transmission (e.g., using DCI format 0_1 or 0_2). There are different mechanisms for indicating OLPC power levels depending on whether an SRI is configured in the DCI that schedules the PUSCH (e.g., the uplink grant). An SRI field is a field of DCI that can include a sounding reference signal (SRS) resource indicator. An SRS resource indicator is used to indicate the beam/precoder of the scheduled uplink transmission. Furthermore, an SRS resource indicator can be used by a base station to indicate a set of power control parameter sets (such as an OLPC power level). For example, an SRS resource indicator may indicate an SRS resource set associated with a usage. An SRS may be configured using one or more SRS resource sets, where each set includes one or more SRS resources. The usage can be configured at the resource set granularity. For example, one SRS resource set can be configured for non-codebook based transmission while another SRS resource set can be configured for downlink channel sounding. An SRI field can be configured (e.g., present) or not configured (e.g., not present) for some DCI formats such as DCI Format 0_1 or DCI Format 0_2.

However, if the UE is configured with DCI Format 0_1 and 0_2 (or any two DCI formats that can provide indications of OLPC power levels for an uplink transmission), and only one of these DCI formats is configured with an SRI, then there may be ambiguity in how to interpret the OLPC power level indicated in the uplink grant, as described in more detail below.

If the SRI is configured in a DCI format, then the DCI format may only be configurable with a one-bit OLPC parameter set indication field. In this case, for each SRI codepoint (that is, each value indicatable in the SRI), the UE may be configured with a corresponding unboosted power parameter set (e.g., P0-PUSCH-AlphaSet, which indicates an OLPC power level defined by a P0 value) and a corresponding boosted power parameter set (e.g., P0-PUSCH-set, which indicates an OLPC power level defined by a P0 value). A P0 value indicated for the unboosted power parameter set may denote an unboosted transmit power, and a P0 value indicated for the boosted power parameter set may denote a boosted transmit power. In this case, for a given SRI, there may be no distinction between unboosted power for an eMBB transmission and for a URLLC transmission, and different SRI values may be used to distinguish between eMBB and URLLC. For example, a first SRI value may be mapped to an SRS resource set for eMBB transmission, and a second SRI value may be mapped to an SRS resource set for URLLC transmission. The UE may receive DCI carrying an SRI field. The SRI may indicate an SRS resource set configured with P0-PUSCH-AlphaSet and P0-PUSCH-set parameter sets. For example, a value (e.g., codepoint) of the SRI field may be mapped to a P0-PUSCH-set identifier value and a p0-PUSCH-alphaSet identifier value of P0-PUSCH-AlphaSet and P0-PUSCH-set. The UE may first determine the corresponding P0-PUSCH-AlphaSet and P0-PUSCH-set parameter set corresponding to a received codepoint in the SRI field (since the received codepoint points to an unboosted power parameter set and a boosted power parameter set), then may determine which P0 value (e.g., out of the boosted power parameter set indicated by P0-PUSCH-set and the unboosted power parameter set indicated by P0-PUSCH-AlphaSet) is to be used based at least in part on the one-bit OLPC parameter set indication field. For example, if the OLPC parameter set indication field indicates 0, then the UE may use the P0 contained in P0-PUSCH-AlphaSet, and if the OLPC parameter set indication field indicates 1, then UE may use the P0 value configured in P0-PUSCH-set. Thus, the above-described technique allows for OLPC using DCI with a configured SRI field. Below, OLPC using a DCI with no configured SRI field is described.

If the SRI field is not configured in the DCI format, then the UE may be configured with 1 or 2 bits for the OLPC parameter set indication field in the DCI. The UE may be configured with P0-PUSCH-AlphaSet and P0-PUSCH-Set, where there can be up to two P0 values configured in P0-PUSCH-Set. The UE may use P0 from P0-PUSCH-AlphaSet if the OLPC parameter set indication field is "0" or "00." The UE may use the first value in P0-PUSCH-Set if the OLPC parameter set indication field is "1" or "01." The UE may use the second value in P0-PUSCH-Set if the OLPC indication field is "10."

If the SRI field is configured in one DCI format of DCI formats 0_1 and 0_2, but not in the other DCI format of DCI formats 0_1 and 0_2, then the UE may be configured with more than one P0-PUSCH-set configuration (e.g., one configuration corresponding to the first of the two DCI formats and another configuration corresponding to the second of the two DCI formats). In this case, if the UE is scheduled by the DCI format that does not contain the SRI field, then the UE may use the P0-PUSCH-set configuration that has a lowest identifier (e.g., is the first configured P0-PUSCH-set). In addition, if two bits are configured for the OLPC parameter set indication field in the DCI format (such as for the DCI format that does not include an SRI field), then the UE may expect that the parameter set P0-PUSCH-set that has the lowest identifier contains 2 P0 values. In this case, "01" and "10" of the OLPC parameter set indication field may be used to indicate which P0 value of P0-PUSCH-Set to use (as described above).

However, in the DCI format with the configured SRI field, only a one-bit OLPC parameter set indication field can be configured (since one-bit OLPC parameter set indication fields are configured for DCI formats with an SRI field). Therefore, the DCI format may not be able to indicate which P0 value of P0-PUSCH-Set to use, if multiple P0 values are configured. For example, if there are two P0 values configured in the P0-PUSCH-set with the lowest identifier, and if the UE is scheduled with a PUSCH transmission by the DCI format that has the SRI field (and a 1-bit OLPC parameter set indication field), and if the SRI field indicates an SRI value that corresponds to the P0-PUSCH-set with the lowest identifier, then the UE may not have sufficient information to determine which P0 value in the P0-PUSCH-set with the lowest identifier should be used to compute the transmit power for the PUSCH transmission if the 1-bit OLPC parameter set indication field indicates a value of 1.

Some techniques and apparatuses described herein provide resolution of ambiguity with regard to determination of a P0 value for a UE that is configured with at least two DCI formats, of which one is configured with an SRI field and another is not configured with an SRI field. In a first approach, the UE may use a larger P0 value of two P0 values configured in the P0-PUSCH-set. Thus, the UE may use the boosted transmit power parameter set, thereby ensuring that an overlapped URLLC transmission is transmitted with sufficient power to overcome interference from an overlapped eMBB transmission. For example, if a value of the OLPC parameter set indication field is '1', the UE determines a value of P0 from a larger value of the P0 value(s) configured in P0-PUSCH-Set with a p0-PUSCH-SetId value mapped to the SRI field value. In a second approach, the UE may use a lowest-indexed or a highest-indexed P0 value, and a corresponding base station may configure the P0-PUSCH-set so that a boosted power is mapped to the P0 value that the UE is configured to use (e.g., the base station may map the boosted power parameter set to the lowest-indexed P0 value if the UE is to automatically use the lowest-indexed P0 value, or may map the boosted power parameter set to the highest-indexed P0 value if the UE is to automatically use the highest-indexed P0 value). The boosted power level may use a larger P0 value than an unboosted power level. This may conserve processing resources of the UE relative to the first approach. In a third approach, the base station may configure the DCI formats such that none of the SRI codepoints in the DCI format that is configured with the SRI field maps to a P0-PUSCH-set that contains multiple P0 values. In other words, the P0-PUSCH-set that contains more than 1 P0 value may only be used for PUSCH transmissions scheduled by the DCI format that does not contain the SRI field.

Thus, the UE and/or the BS may resolve or avoid ambiguity in dynamic indication of OLPC for a UE that is configured with multiple DCI formats. In this way, reliability of URLLC services is improved without a significant increase in overhead. In addition to solving the ambiguity, the proposed approaches provide for the UE to determine a P0 value such that the UE uses sufficiently high transmit power to combat the interference from the other (eMBB) transmissions.

Figure 3:
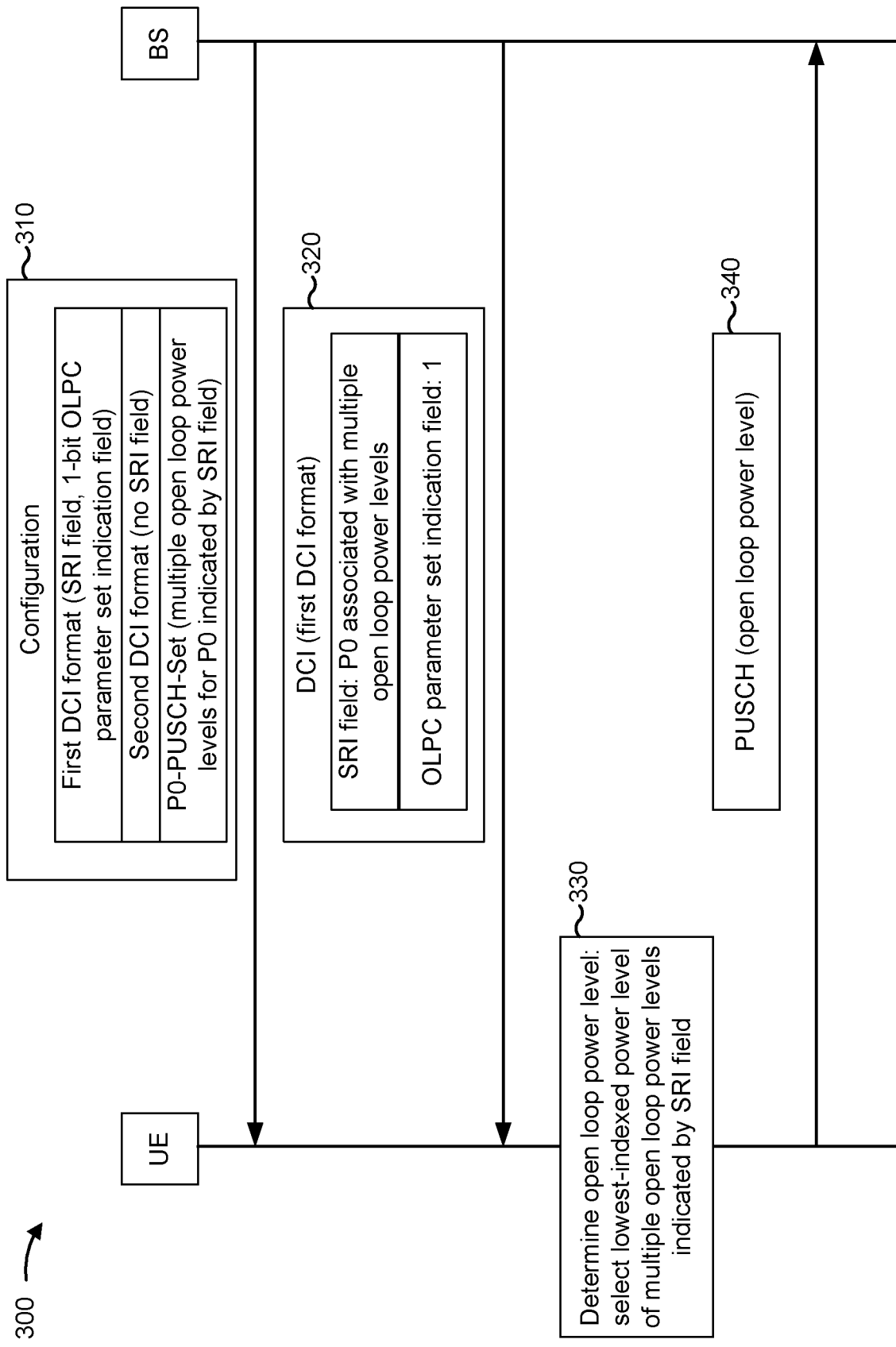
FIG. 3 is a diagram illustrating an example of signaling associated with open-loop power control parameter determination for mixed downlink control information formats, in accordance with the present disclosure.

FIG. 3 is a diagram illustrating an example 300 of signaling associated with open-loop power control parameter set determination for mixed downlink control information formats, in accordance with the present disclosure. As shown, example 300 includes a UE (e.g., UE 120) and a base station (e.g., BS 110).

As shown by reference number 310, the base station may configure the UE. For example, the base station may transmit configuration information to the UE, such as via RRC signaling. As shown, the configuration information may indicate a configuration for a first DCI format and a configuration for a second DCI format. The configuration for the first DCI format may indicate that the first DCI format includes an SRI field and that the first DCI format includes a 1-bit OLPC parameter set indication field (sometimes referred to herein as a single-bit indication field). The OLPC parameter set indication field may indicate which set of open loop power control parameter sets (such as P0-PUSCH-AlphaSet for an unboosted or baseline transmit power or P0-PUSCH-Set for a boosted transmit power) should be used to determine a transmit power for a PUSCH scheduled by the DCI. The configuration for the second DCI format may indicate that the second DCI format does not include an SRI field. In some aspects, the second DCI format may include a 1-bit OLPC parameter set indication field. In other aspects, the second DCI format may include a 2-bit OLPC parameter set indication field.

As further shown, the configuration information may indicate a configuration of a power parameter set indicated by the SRI field. For example, the power parameter set may indicate an open loop power level (such as a value of P0 configured in P0-PUSCH-Set), and multiple open loop power levels may be configured for a given power parameter set. For example, the UE may be configured with more than one P0-PUSCH-Set configuration (one corresponding to the DCI with the SRI field and another corresponding to the DCI without the SRI field), which may lead to multiple open loop power levels being configured for an SRI value (e.g., codepoint) of the SRI field based at least in part on the UE being configured with one DCI format having an SRI field and another DCI format not having the SRI field. In this case, if the SRI value indicates the multiple open loop power levels, ambiguity arises in which open loop power level (that is, which P0 value) should be used to transmit the PUSCH.

As shown by reference number 320, the base station may transmit DCI to the UE. As further shown, the DCI uses the first DCI format, an SRI codepoint of the SRI field of the DCI indicates the multiple open loop power levels, and the OLPC parameter set indication field of the DCI includes only a single bit, which cannot be used to differentiate which open loop power level should be used. Here, the OLPC parameter set indication field is set to "1," which indicates that the UE should use a P0 value from P0-PUSCH-Set (which is associated with the ambiguity described above). If the OLPC parameter set indication field is set to "0," then the UE may use a P0 value from P0-PUSCH-AlphaSet.

As shown by reference number 330, the UE may determine an open loop power level. For example, the UE may determine the open loop power level based at least in part on the SRI field and the single-bit indication field. As shown, the UE may select a lowest-indexed power level of the multiple open loop power levels indicated by the SRI field. For example, if the UE is configured in P0-PUSCH-Set with a P0 value having an index 0 associated with the SRI value of the SRI field and a P0 value having an index 1 associated with the SRI value of the SRI field, the UE may select the P0 value having the index 0. The base station may determine that the lowest-indexed power level should be selected. In some aspects, the base station may configure the lowest-indexed power level to use a power boost. For example, the lowest-indexed power level may have a higher power level than another power level, such as a higher-indexed power level of P0-PUSCH-Set. Thus, the base station may ensure that a boosted transmit power is used in the conditions shown in example 300, which may facilitate transmission of a higher-priority PUSCH at acceptable reliability levels.

As shown by reference number 340, the UE may transmit the PUSCH using an open loop power level. For example, the UE may use the value of P0 selected at reference number 330 as an input to an open loop power control formula. The open loop power control formula may output a transmit power. The UE may transmit the PUSCH using the transmit power. In this way, the ambiguity associated with the multiple open loop power levels is resolved, which improves the reliability of the network, reduces signaling overhead, and enables the transmission of a PUSCH associated with a boosted power level (such as for URLLC communication, high reliability communication, or the like).

As indicated above, FIG. 3 is provided as an example. Other examples may differ from what is described with regard to FIG. 3.

Figure 4:
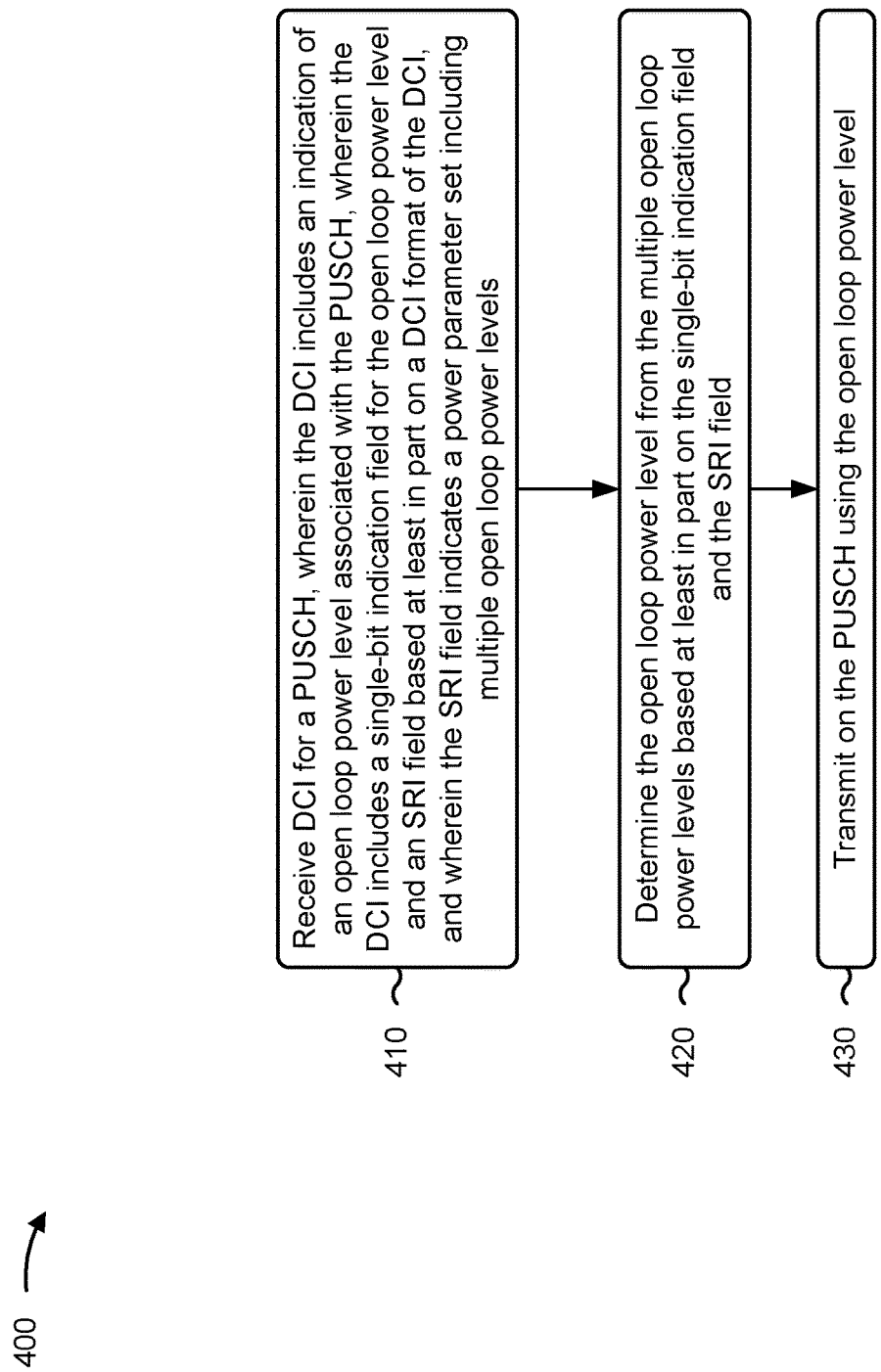
FIG. 4 is a diagram illustrating an example method performed, for example, by a UE, in accordance with the present disclosure.

FIG. 4 is a diagram illustrating an example method 400 performed, for example, by a UE, in accordance with the present disclosure. Example method 400 is an example where the UE (e.g., UE 120) performs operations associated with open-loop power control parameter set determination.

As shown in FIG. 4, in some aspects, method 400 may include receiving DCI for a PUSCH, wherein the DCI includes an indication of an open loop power level associated with the PUSCH, wherein the DCI includes a single-bit indication field for the open loop power level and an SRI field based at least in part on a DCI format of the DCI, and wherein the SRI field indicates a power parameter set including multiple open loop power levels (block 410). For example, the UE (e.g., using reception component 602, depicted in FIG. 6) may receive, via DCI, scheduling information for a PUSCH. The scheduling information may indicate an indication of an open loop power level associated with the PUSCH, as described above. In some aspects, a DCI format of the DCI includes a single-bit indication field for the open loop power level and an SRI field. In some aspects, multiple open loop power levels are configured for a power parameter set indicated by the SRI field.

As further shown in FIG. 4, in some aspects, method 400 may include determining the open loop power level from the multiple open loop power levels based at least in part on the single-bit indication field and the SRI field (block 420). For example, the UE (e.g., using power control component 608, depicted in FIG. 6) may determine the open loop power level in accordance with the indication and based at least in part on the single-bit indication field and the SRI field, as described above.

As further shown in FIG. 4, in some aspects, method 400 may include transmitting on the PUSCH using the open loop power level (block 430). For example, the UE (e.g., using transmission component 604, depicted in FIG. 6) may transmit the on PUSCH using the open loop power level, as described above.

Method 400 may include additional aspects, such as any single aspect or any combination of aspects described below and/or in connection with one or more other processes described elsewhere herein.

In a first aspect, determining the open loop power level further comprises selecting a lowest-indexed power level of the multiple open loop power levels as the open loop power level used to transmit on the PUSCH.

In a second aspect, alone or in combination with the first aspect, the lowest-indexed power level is configured to be associated with a boosted power level.

In a third aspect, alone or in combination with one or more of the first and second aspects, the boosted power level is larger than a power level configured for another power level of the multiple open loop power levels.

In a fourth aspect, alone or in combination with one or more of the first through third aspects, the indication of the single-bit indication field is 1.

In a fifth aspect, alone or in combination with one or more of the first through fourth aspects, the single-bit indication field is an open loop power control parameter set indication field.

In a sixth aspect, alone or in combination with one or more of the first through fifth aspects, multiple open loop power levels are configured for the power parameter set indicated by the SRI field due to the UE being configured with the DCI format with the SRI field and another DCI format without the SRI field.

In a seventh aspect, alone or in combination with one or more of the first through sixth aspects, determining the open loop power level comprises determining the open loop power level based at least in part on a preconfigured rule.

In an eighth aspect, alone or in combination with one or more of the first through seventh aspects, the preconfigured rule indicates to select a lowest-indexed open loop power level, of the multiple open loop power levels, as the open loop power level used to transmit the PUSCH.

In a ninth aspect, alone or in combination with one or more of the first through eighth aspects, the DCI format is a first DCI format, and the method 400 further comprises receiving configuration information from a base station configuring the UE with the first DCI format and a second DCI format, wherein in the second DCI format, the DCI does not comprise the SRI field present in the first DCI format and the DCI comprises a two-bit indication field for the open loop power level.

Although FIG. 4 shows example blocks of method 400, in some aspects, method 400 may include additional blocks, fewer blocks, different blocks, or differently arranged blocks than those depicted in FIG. 4. Additionally, or alternatively, two or more of the blocks of method 400 may be performed in parallel.

Figure 5:
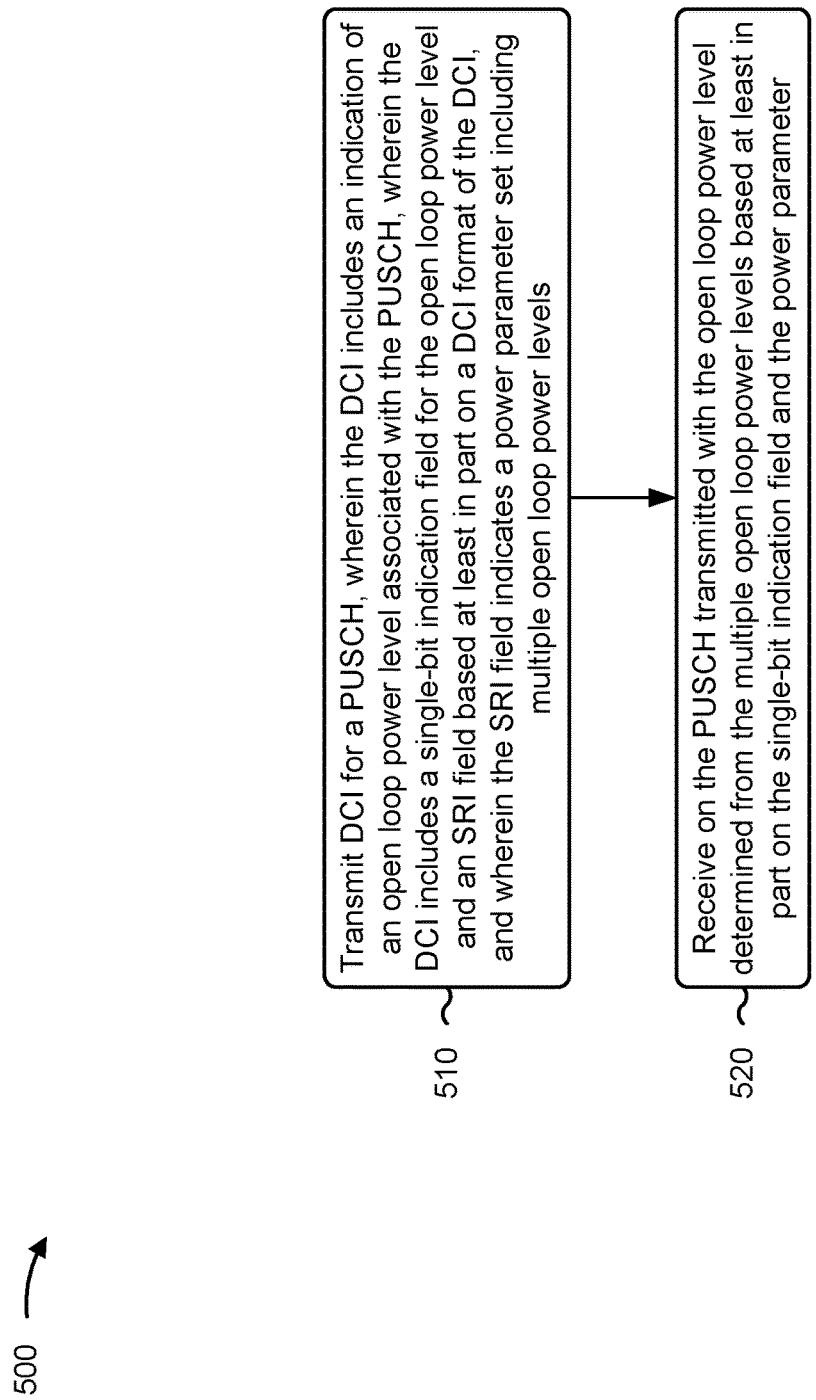
FIG. 5 is a diagram illustrating an example method performed, for example, by a base station, in accordance with the present disclosure.

FIG. 5 is a diagram illustrating an example method 500 performed, for example, by a base station, in accordance with the present disclosure. Example method 500 is an example where the base station (e.g., base station 110) performs operations associated with open-loop power control parameter set determination.

As shown in FIG. 5, in some aspects, method 500 may include transmitting DCI for a PUSCH, wherein the DCI includes an indication of an open loop power level associated with the PUSCH, wherein the DCI includes a single-bit indication field for the open loop power level and an SRI field based at least in part on a DCI format of the DCI, and wherein the SRI field indicates a power parameter set including multiple open loop power levels (block 510). For example, the base station (e.g., using transmission component 704, depicted in FIG. 7) may transmit, via DCI, scheduling information for a PUSCH. The scheduling information may indicate an indication of an open loop power level associated with the PUSCH, as described above. In some aspects, a DCI format of the DCI includes a single-bit indication field for the open loop power level and an SRI field, and multiple open loop power levels are configured for a power parameter set indicated by the SRI field.

As further shown in FIG. 5, in some aspects, method 500 may include receiving on the PUSCH transmitted with the open loop power level determined from the multiple open loop power levels based at least in part on the single-bit indication field and the power parameter (block 520). For example, the base station (e.g., using reception component 702, depicted in FIG. 7) may receive on the PUSCH. The PUSCH may be transmitted with the open loop power level determined from the multiple open loop power levels based at least in part on the single-bit indication field and the power parameter. In some aspects, the open loop power level of the PUSCH uses a lowest-indexed power level of the multiple open loop power levels, as described above.

Method 500 may include additional aspects, such as any single aspect or any combination of aspects described below and/or in connection with one or more other processes described elsewhere herein.

In a first aspect, method 500 includes configuring (e.g., using configuration component 708, depicted in FIG. 7) the open loop power level of the PUSCH uses a lowest-indexed power level of the multiple open loop power levels.

In a second aspect, alone or in combination with the first aspect, method 500 includes configuring (e.g., using configuration component 708, depicted in FIG. 7) a user equipment so that the lowest-indexed power level is associated with a boosted power level.

In a third aspect, alone or in combination with one or more of the first and second aspects, the boosted power level is larger than a power level configured for another power level of the multiple open loop power levels.

In a fourth aspect, alone or in combination with one or more of the first through third aspects, the DCI format is a first DCI format and method 500 includes configuring, for the UE, the first DCI format, a second DCI format, and the power parameter set using RRC signaling, wherein multiple open loop power levels are configured for the power parameter set indicated by the SRI field due to the first DCI format having the SRI field and the second DCI format not having the SRI field.

In a fifth aspect, alone or in combination with one or more of the first through fourth aspects, the indication of the single-bit indication field is 1.

In a sixth aspect, alone or in combination with one or more of the first through fifth aspects, the single-bit indication field is an open loop power control parameter set indication field.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
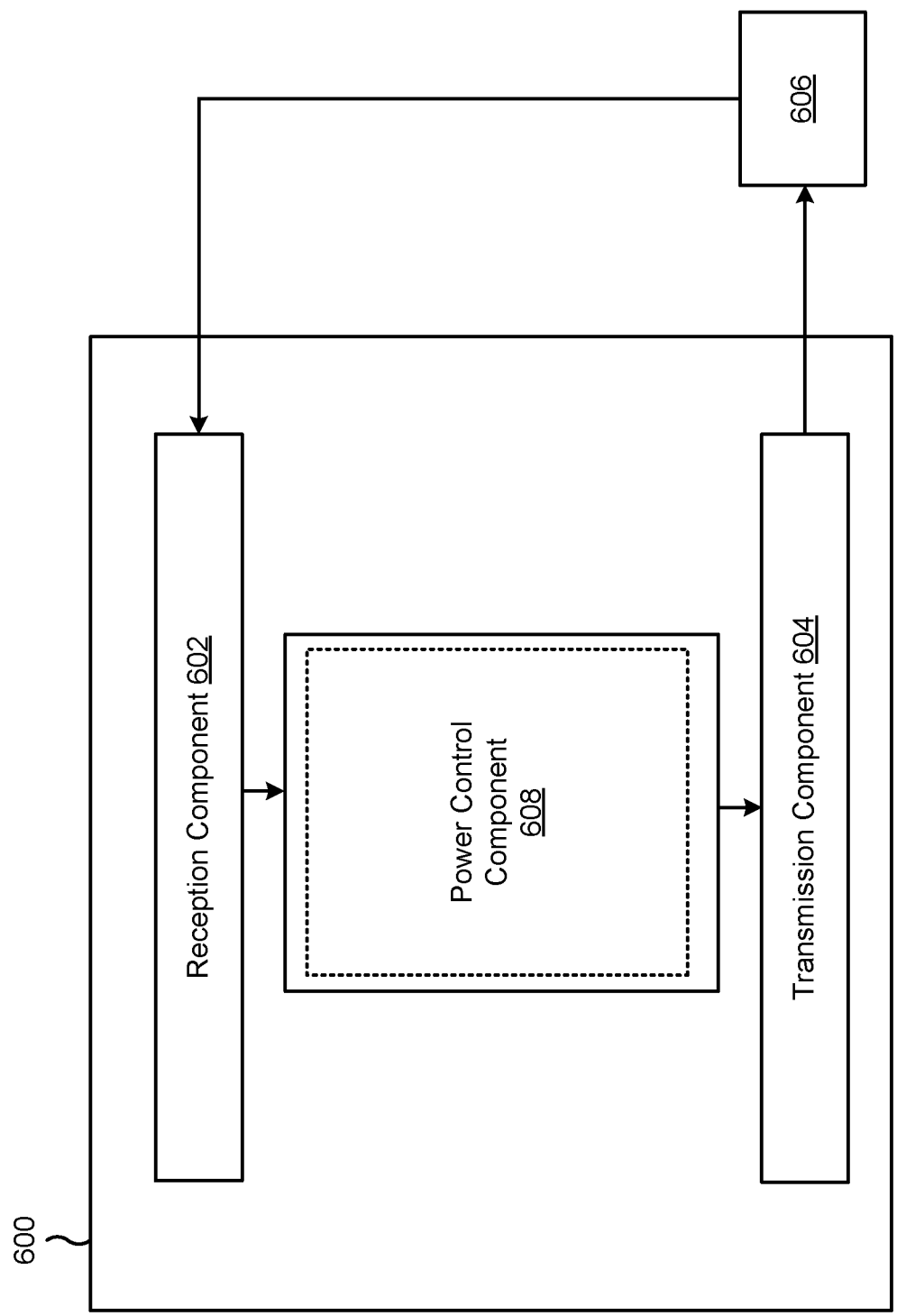
FIG. 6 is a block diagram of an example apparatus for wireless communication, in accordance with the present disclosure.

FIG. 6 is a block diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a power control component 608, among other examples.

Figure 8:
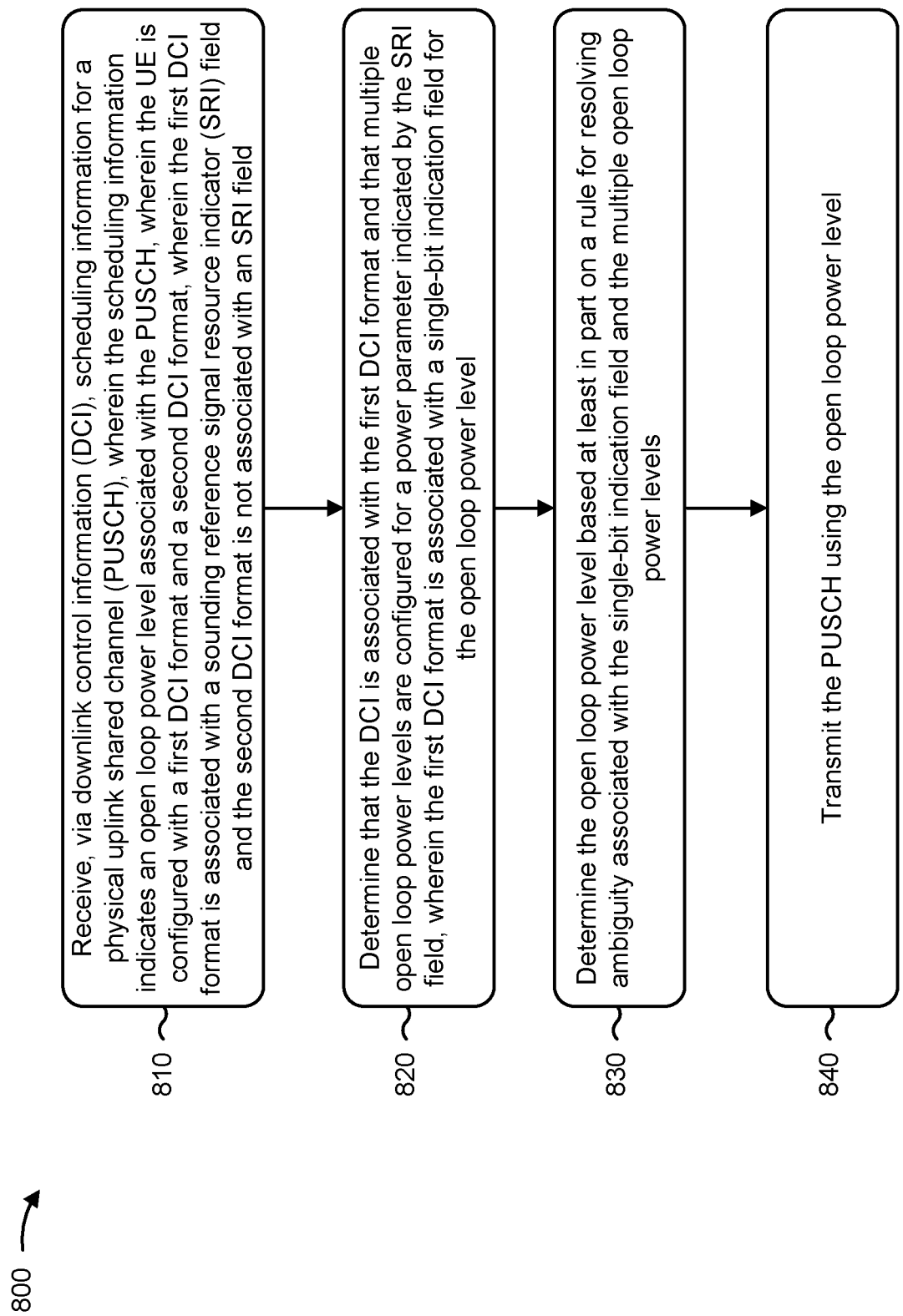
FIGS. 8-10 are diagrams illustrating example processes associated with open-loop power control (OLPC) parameter determination for mixed downlink control information (DCI) formats, in accordance with the present disclosure.

In some aspects, the apparatus 600 may be configured to perform one or more operations described herein in connection with FIGS. 3 and 8. Additionally, or alternatively, the apparatus 600 may be configured to perform one or more processes described herein, such as method 400 of FIG. 4, method 800 of FIG. 8, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive DCI for a PUSCH, wherein the DCI includes an indication of an open loop power level associated with the PUSCH. The DCI may include a single-bit indication field for the open loop power level and an SRI field, and multiple open loop power levels may be configured for a power parameter set indicated by the SRI field. The power control component 608 may determine the open loop power level based at least in part on the single-bit indication field and the SRI field. The transmission component 604 may transmit on the PUSCH using the open loop power level.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
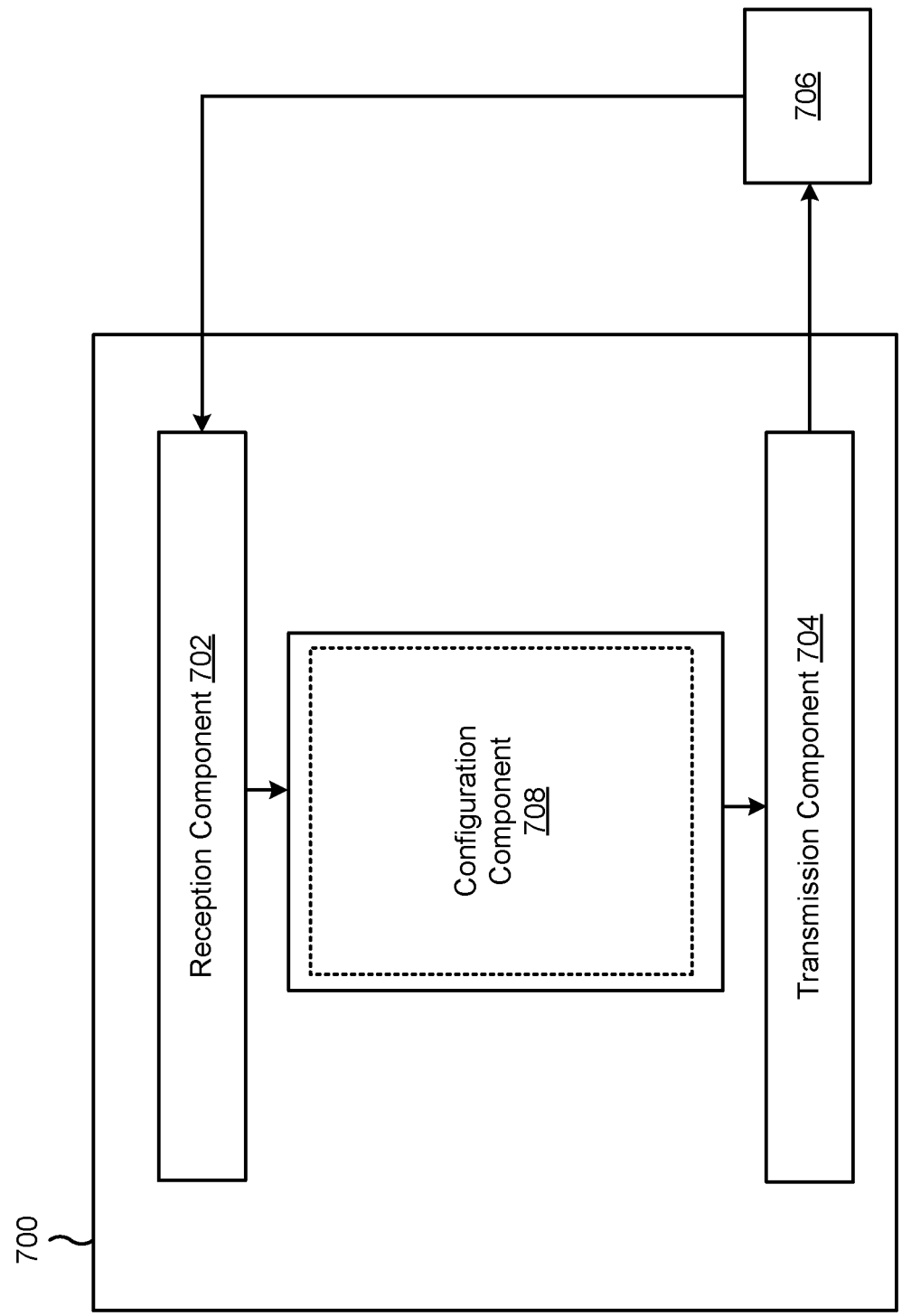
FIG. 7 is a block diagram of an example apparatus for wireless communication, in accordance with the present disclosure.

FIG. 7 is a block diagram of an example apparatus 700 for wireless communication, in accordance with the present disclosure. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a configuration component 708, among other examples.

Figure 9:
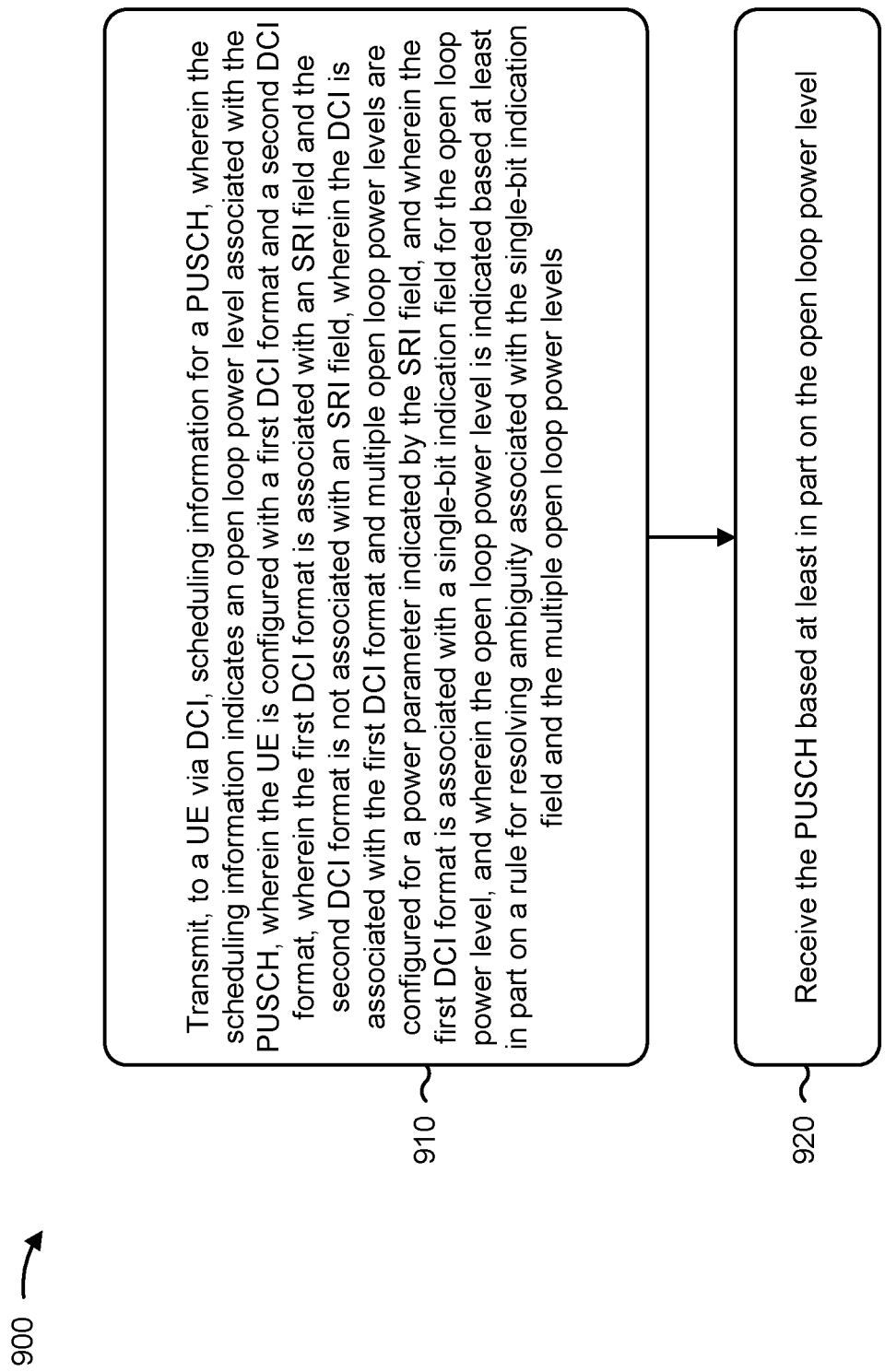
Figure 10:
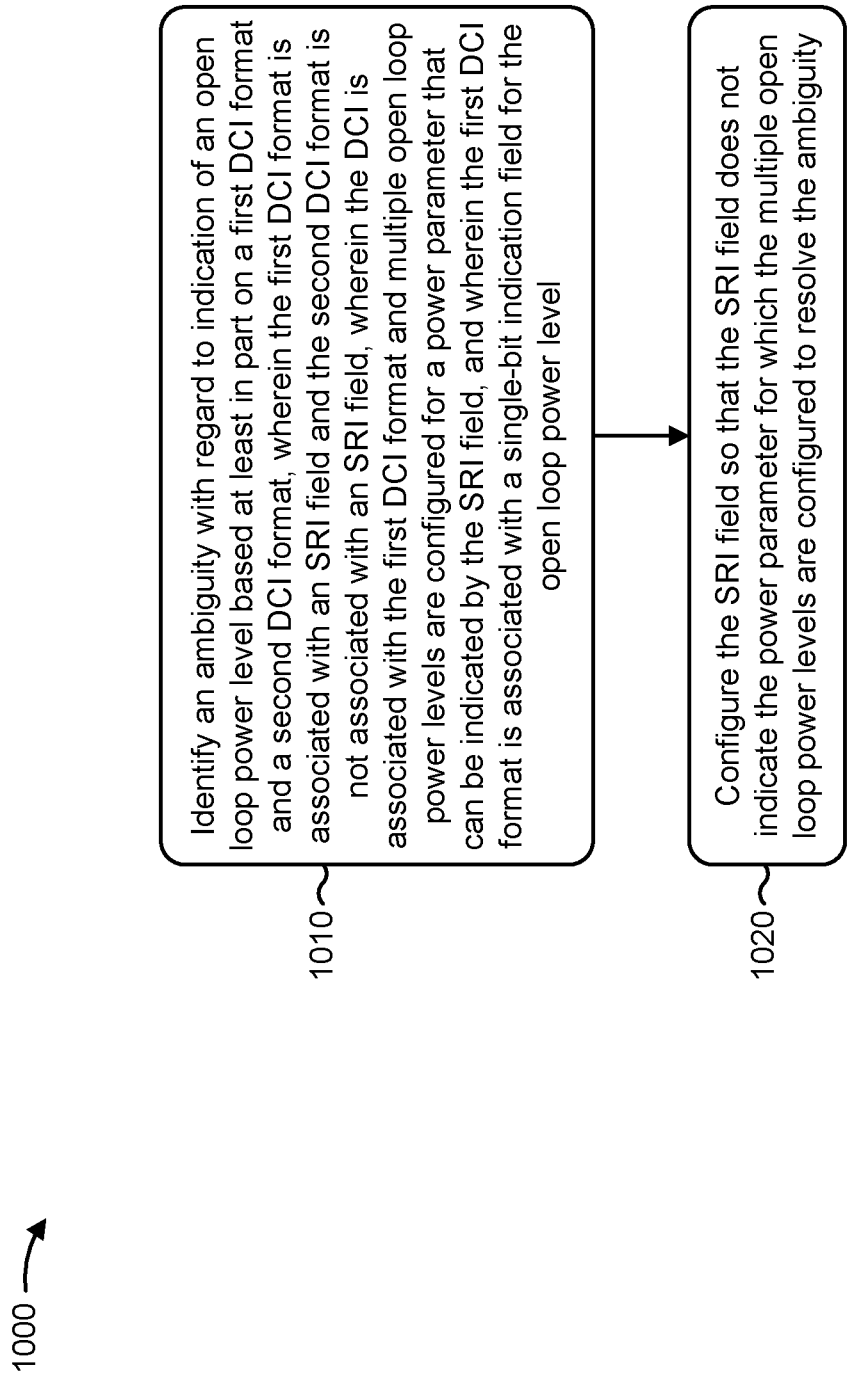

In some aspects, the apparatus 700 may be configured to perform one or more operations described herein in connection with FIGS. 3, 9, and 10. Additionally, or alternatively, the apparatus 700 may be configured to perform one or more processes described herein, such as method 500 of FIG. 5, method 900 of FIG. 9, method 1000 of FIG. 10, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit DCI for a PUSCH. The DCI may include an indication of an open loop power level associated with the PUSCH. A DCI format of the DCI may include a single-bit indication field for the open loop power level and a SRI field, and multiple open loop power levels may be configured for a power parameter set indicated by the SRI field. The reception component 702 may receive the PUSCH, wherein the open loop power level of the PUSCH uses a lowest-indexed power level of the multiple open loop power levels.

The configuration component 708 may configure the lowest-indexed power level to be associated with a boosted power level.

The configuration component 708 may configure, for the UE, a first DCI format, a second DCI format, and the power parameter set using RRC signaling, wherein multiple open loop power levels are configured for the power parameter set indicated by the SRI field due to the first DCI format having the SRI field and the second DCI format not having the SRI field.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

FIG. 8 is a diagram illustrating an example method 800 performed, for example, by a UE, in accordance with the present disclosure. Example method 800 is an example where the UE (e.g., UE 120 and/or the like) performs operations associated with open-loop power control parameter set determination for mixed downlink control information formats.

As shown in FIG. 8, in some aspects, method 800 may include receiving, via DCI, scheduling information for a PUSCH, wherein the scheduling information indicates an open loop power level associated with the PUSCH, wherein the UE is configured with a first DCI format and a second DCI format, wherein the first DCI format is associated with an SRI field and the second DCI format is not associated with an SRI field (block 810). For example, the UE (e.g., using antenna 252, DEMOD 254, MIMO detector 256, receive processor 258, controller/processor 280, and/or the like) may receive, via DCI, scheduling information for a PUSCH, as described above. In some aspects, the scheduling information indicates an open loop power level associated with the PUSCH. In some aspects, the UE is configured with a first DCI format and a second DCI format. In some aspects, the first DCI format is associated with an SRI field and the second DCI format is not associated with an SRI field.

As further shown in FIG. 8, in some aspects, method 800 may include determining that the DCI is associated with the first DCI format and that multiple open loop power levels are configured for a power parameter set indicated by the SRI field, wherein the first DCI format is associated with a single-bit indication field for the open loop power level (block 820). For example, the UE (e.g., using antenna 252, DEMOD 254, MIMO detector 256, receive processor 258, controller/processor 280, and/or the like) may determine that the DCI is associated with the first DCI format and that multiple open loop power levels are configured for a power parameter set indicated by the SRI field, as described above. In some aspects, the first DCI format is associated with a single-bit indication field for the open loop power level.

As further shown in FIG. 8, in some aspects, method 800 may include determining the open loop power level based at least in part on a rule for resolving ambiguity associated with the single-bit indication field and the multiple open loop power levels (block 830). For example, the UE (e.g., using controller/processor 280, transmit processor 264, TX MIMO processor 266, MOD 254, antenna 252, and/or the like) may determine the open loop power level based at least in part on a rule for resolving ambiguity associated with the single-bit indication field and the multiple open loop power levels, as described above.

As further shown in FIG. 8, in some aspects, method 800 may include transmitting the PUSCH using the open loop power level (block 840). For example, the UE (e.g., using controller/processor 280, transmit processor 264, TX MIMO processor 266, MOD 254, antenna 252, and/or the like) may transmit the PUSCH using the open loop power level, as described above.

Method 800 may include additional aspects, such as any single aspect or any combination of aspects described below and/or in connection with one or more other processes described elsewhere herein.

In a first aspect, the rule indicates to select a highest open loop power level, of the multiple open loop power levels, as the open loop power level used to transmit the PUSCH.

In a second aspect, alone or in combination with the first aspect, the highest open loop power level is associated with a boosted power level for a URLLC service.

In a third aspect, alone or in combination with one or more of the first and second aspects, the multiple open loop power levels are associated with a URLLC service.

In a fourth aspect, alone or in combination with one or more of the first through third aspects, the rule indicates to select a lowest-indexed power level of the multiple open loop power levels as the open loop power level used to transmit the PUSCH.

In a fifth aspect, alone or in combination with one or more of the first through fourth aspects, the lowest-indexed power level is configured to be associated with a boosted power level.

In a sixth aspect, alone or in combination with one or more of the first through fifth aspects, the rule indicates to select a highest-indexed power level of the multiple open loop power levels as the open loop power level used to transmit the PUSCH.

In a seventh aspect, alone or in combination with one or more of the first through sixth aspects, the highest-indexed power level is configured to be associated with a boosted power level.

In an eighth aspect, alone or in combination with one or more of the first through seventh aspects, the ambiguity associated with the single-bit indication field is based at least in part on single-bit indication field indicating a value of 1.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

FIG. 9 is a diagram illustrating an example method 900 performed, for example, by a base station, in accordance with the present disclosure. Example method 900 is an example where the base station (e.g., BS 110 and/or the like) performs operations associated with open-loop power control parameter set determination for mixed downlink control information formats.

As shown in FIG. 9, in some aspects, method 900 may include transmitting, to a UE via DCI, scheduling information for a PUSCH, wherein the scheduling information indicates an open loop power level associated with the PUSCH, wherein the UE is configured with a first DCI format and a second DCI format, wherein the first DCI format is associated with an SRI field and the second DCI format is not associated with an SRI field, wherein the DCI is associated with the first DCI format and multiple open loop power levels are configured for a power parameter set indicated by the SRI field, and wherein the first DCI format is associated with a single-bit indication field for the open loop power level, and wherein the open loop power level is indicated based at least in part on a rule for resolving ambiguity associated with the single-bit indication field and the multiple open loop power levels (block 910). For example, the base station (e.g., using controller/processor 240, transmit processor 220, TX MIMO processor 230, MOD 232, antenna 234, and/or the like) may transmit, to a UE via DCI, scheduling information for a PUSCH, as described above. In some aspects, the scheduling information indicates an open loop power level associated with the PUSCH. In some aspects, the UE is configured with a first DCI format and a second DCI format. In some aspects, the first DCI format is associated with an SRI field and the second DCI format is not associated with an SRI field. In some aspects, the DCI is associated with the first DCI format and multiple open loop power levels are configured for a power parameter set indicated by the SRI field. In some aspects, the first DCI format is associated with a single-bit indication field for the open loop power level. In some aspects, the open loop power level is indicated based at least in part on a rule for resolving ambiguity associated with the single-bit indication field and the multiple open loop power levels.

As further shown in FIG. 9, in some aspects, method 900 may include receiving the PUSCH based at least in part on the open loop power level (block 920). For example, the base station (e.g., using antenna 234, DEMOD 232, MIMO detector 236, receive processor 238, controller/processor 240, and/or the like) may receive the PUSCH based at least in part on the open loop power level, as described above.

Method 900 may include additional aspects, such as any single aspect or any combination of aspects described below and/or in connection with one or more other processes described elsewhere herein.

In a first aspect, the rule indicates to select a highest open loop power level, of the multiple open loop power levels, as the open loop power level used to transmit the PUSCH.

In a second aspect, alone or in combination with the first aspect, the highest open loop power level is associated with a boosted power level for a URLLC service.

In a third aspect, alone or in combination with one or more of the first and second aspects, the multiple open loop power levels are associated with a URLLC service.

In a fourth aspect, alone or in combination with one or more of the first through third aspects, the rule indicates to select a lowest-indexed power level of the multiple open loop power levels as the open loop power level used to transmit the PUSCH.

In a fifth aspect, alone or in combination with one or more of the first through fourth aspects, method 900 includes configuring the lowest-indexed power level to be associated with a boosted power level.

In a sixth aspect, alone or in combination with one or more of the first through fifth aspects, the rule indicates to select a highest-indexed power level of the multiple open loop power levels as the open loop power level used to transmit the PUSCH.

In a seventh aspect, alone or in combination with one or more of the first through sixth aspects, method 900 includes configuring the highest-indexed power level to be associated with a boosted power level.

In an eighth aspect, alone or in combination with one or more of the first through seventh aspects, method 900 includes configuring the first DCI format, the second DCI format, and the power parameter set using RRC signaling.

In a ninth aspect, alone or in combination with one or more of the first through eighth aspects, the ambiguity associated with the single-bit indication field is based at least in part on single-bit indication field indicating a value of 1.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

FIG. 10 is a diagram illustrating an example method 1000 performed, for example, by a base station, in accordance with the present disclosure. Example method 1000 is an example where the base station (e.g., BS 110 and/or the like) performs operations associated with open-loop power control parameter set determination for mixed downlink control information formats.

As shown in FIG. 10, in some aspects, method 1000 may include identifying an ambiguity with regard to indication of an open loop power level based at least in part on a first DCI format and a second DCI format, wherein the first DCI format is associated with a sounding reference signal resource indicator field and the second DCI format is not associated with an SRI field, wherein the DCI is associated with the first DCI format and multiple open loop power levels are configured for a power parameter set that can be indicated by the SRI field, and wherein the first DCI format is associated with a single-bit indication field for the open loop power level (block 1010). For example, the base station (e.g., using controller/processor 240, transmit processor 220, TX MIMO processor 230, MOD 232, antenna 234, and/or the like) may identify an ambiguity with regard to indication of an open loop power level based at least in part on a first DCI format and a second DCI format. The first DCI format may be associated with an SRI field and the second DCI format may not be associated with an SRI field. The DCI may be associated with the first DCI format and multiple open loop power levels may be configured for a power parameter set that can be indicated by the SRI field. The first DCI format may be associated with a single-bit indication field for the open loop power level. In some aspects, this identification may be implicit (e.g., based at least in part on a wireless communication standard or a configuration of the base station not to configure the SRI field so that the SRI field indicates a power parameter set for which multiple open loop power levels are configured).

As further shown in FIG. 10, in some aspects, method 1000 may include configuring the SRI field so that the SRI field does not indicate the power parameter set for which the multiple open loop power levels are configured to resolve the ambiguity (block 1020). For example, the base station (e.g., using antenna 234, DEMOD 232, MIMO detector 236, receive processor 238, controller/processor 240, and/or the like) may configure the SRI field so that the SRI field does not indicate the power parameter set for which the multiple open loop power levels are configured. Thus, the base station may resolve the ambiguity, as described above.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

The following provides an overview of some Aspects of the present disclosure:

Aspect 1: A method of wireless communication performed by a user equipment (UE), comprising: receiving downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; determining the open loop power level from the multiple open loop power levels based at least in part on the single-bit indication field and the SRI field; and transmitting on the PUSCH using the open loop power level.

Aspect 2: The method of Aspect 1, wherein determining the open loop power level further comprises: selecting a lowest-indexed power level of the multiple open loop power levels as the open loop power level used to transmit on the PUSCH.

Aspect 3: The method of Aspect 2, wherein the lowest-indexed power level is configured to be associated with a boosted power level.

Aspect 4: The method of Aspect 3, wherein the boosted power level is larger than a power level configured for another power level of the multiple open loop power levels.

Aspect 5: The method of any of Aspects 1-4, wherein the indication of the single-bit indication field is 1.

Aspect 6: The method of any of Aspects 1-5, wherein the single-bit indication field is an open loop power control parameter set indication field.

Aspect 7: The method of any of Aspects 1-6, wherein the multiple open loop power levels are configured for the power parameter set indicated by the SRI field due to the UE being configured with the DCI format with the SRI field and another DCI format without the SRI field.

Aspect 8: The method of any of Aspects 1-7, wherein determining the open loop power level comprises determining the open loop power level based at least in part on a preconfigured rule.

Aspect 9: The method of Aspect 8, wherein the preconfigured rule indicates to select a lowest-indexed open loop power level, of the multiple open loop power levels, as the open loop power level used to transmit the PUSCH.

Aspect 10: The method of any of Aspects 1-9, wherein the DCI format is a first DCI format, and wherein the method further comprises: receiving configuration information from a base station configuring the UE with the first DCI format and a second DCI format, wherein in the second DCI format, the DCI does not comprise the SRI field present in the first DCI format and the DCI comprises a two-bit indication field for the open loop power level.

Aspect 11: A method of wireless communication performed by a base station, comprising: transmitting downlink control information (DCI) for a physical uplink shared channel (PUSCH), wherein the DCI includes an indication of an open loop power level associated with the PUSCH, wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; and receiving on the PUSCH transmitted with the open loop power level determined from the multiple open loop power levels based at least in part on the single-bit indication field and the power parameter.

Aspect 12: The method of Aspect 11, wherein the open loop power level of the PUSCH uses a lowest-indexed power level of the multiple open loop power levels.

Aspect 13: The method of Aspect 12, further comprising: configuring a user equipment so that the lowest-indexed power level is associated with a boosted power level.

Aspect 14: The method of Aspect 13, wherein the boosted power level is larger than a power level configured for another power level of the multiple open loop power levels.

Aspect 15: The method of any of Aspects 11-14, wherein the DCI format is a first DCI format, and wherein the method further comprises: configuring, for a user equipment (UE), the first DCI format, a second DCI format, and the power parameter set using radio resource control (RRC) signaling, wherein the multiple open loop power levels are configured for the power parameter set indicated by the SRI field due to the first DCI format having the SRI field and the second DCI format not having the SRI field.

Aspect 16: The method of any of Aspects 11-15, wherein the indication of the single-bit indication field is 1.

Aspect 17: The method of any of Aspects 11-16, wherein the single-bit indication field is an open loop power control parameter set indication field.

Aspect 18: An apparatus for wireless communication at a device, comprising a processor; memory coupled with the processor; and instructions stored in the memory and executable by the processor to cause the apparatus to perform the method of one or more of Aspects 1-10.

Aspect 19: A device for wireless communication, comprising a memory and one or more processors coupled to the memory, the one or more processors configured to perform the method of one or more of Aspects 1-10.

Aspect 20: An apparatus for wireless communication, comprising at least one means for performing the method of one or more of Aspects 1-10.

Aspect 21: A non-transitory computer-readable medium storing code for wireless communication, the code comprising instructions executable by a processor to perform the method of one or more of Aspects 1-10.

Aspect 22: A non-transitory computer-readable medium storing a set of instructions for wireless communication, the set of instructions comprising one or more instructions that, when executed by one or more processors of a device, cause the device to perform the method of one or more of Aspects 1-10.

Aspect 23: An apparatus for wireless communication at a device, comprising a processor; memory coupled with the processor; and instructions stored in the memory and executable by the processor to cause the apparatus to perform the method of one or more of Aspects 11-17.

Aspect 24: A device for wireless communication, comprising a memory and one or more processors coupled to the memory, the one or more processors configured to perform the method of one or more of Aspects 11-17.

Aspect 25: An apparatus for wireless communication, comprising at least one means for performing the method of one or more of Aspects 11-17.

Aspect 26: A non-transitory computer-readable medium storing code for wireless communication, the code comprising instructions executable by a processor to perform the method of one or more of Aspects 11-17.

Aspect 27: A non-transitory computer-readable medium storing a set of instructions for wireless communication, the set of instructions comprising one or more instructions that, when executed by one or more processors of a device, cause the device to perform the method of one or more of Aspects 11-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving downlink control information (DCI) for a physical uplink shared channel (PUSCH), wherein the DCI includes an indication of an open loop power level associated with the PUSCH,
wherein the DCI includes a single-bit indication field for the open loop power level and a sounding reference signal resource indicator (SRI) field based at least in part on a DCI format of the DCI, and wherein the SRI field indicates a power parameter set including multiple open loop power levels;
determining a lowest-indexed power level of the multiple open loop power levels as the open loop power level based at least in part on the single-bit indication field and the SRI field, wherein the lowest-indexed power level is configured to be associated with a power level larger than another power level of the multiple open loop power levels; and
transmitting on the PUSCH using the open loop power level.

2. The method of claim 1, wherein the lowest-indexed power level is configured to be associated with a boosted power level.

3. The method of claim 1, wherein the indication of the single-bit indication field is 1.

4. The method of claim 1, wherein the single-bit indication field is an open loop power control parameter set indication field.

5. The method of claim 1, wherein the multiple open loop power levels are configured for the power parameter set indicated by the SRI field due to the UE being configured with the DCI format with the SRI field and another DCI format without the SRI field.

6. The method of claim 1, wherein determining the open loop power level comprises determining the open loop power level based at least in part on a preconfigured rule.

7. The method of claim 6, wherein the preconfigured rule indicates to select the lowest-indexed power level, of the multiple open loop power levels, as the open loop power level used to transmit the PUSCH.

8. The method of claim 1, wherein the DCI format is a first DCI format, and wherein the method further comprises:
receiving configuration information from a network entity configuring the UE with the first DCI format and a second DCI format,
wherein in the second DCI format, the DCI does not comprise the SRI field present in the first DCI format and the DCI comprises a two-bit indication field for the open loop power level.

9. The method of claim 1, wherein the lowest-indexed power level is associated with an index 0.

10. The method of claim 1, wherein transmitting on the PUSCH comprises:
transmitting on the PUSCH using a transmit power that is based at least in part on an open loop power control formula, wherein the lowest-indexed power level is used as input to the open loop power control formula.

11. A method of wireless communication performed by a network entity, comprising:
transmitting downlink control information (DCI) for a physical uplink shared channel (PUSCH), wherein the DCI includes an indication of an open loop power level associated with the PUSCH,
wherein the DCI includes a single-bit indication field for the open loop power level and a sounding reference signal resource indicator (SRI) field based at least in part on a DCI format of the DCI, and wherein the SRI field indicates a power parameter set including multiple open loop power levels; and
receiving on the PUSCH, wherein the open loop power level of the PUSCH uses a lowest-indexed power level of the multiple open loop power levels, wherein the lowest-indexed power level is configured to be associated with a power level larger than another power level of the multiple open loop power levels.

12. The method of claim 11, further comprising:
configuring a user equipment so that the lowest-indexed power level is associated with a boosted power level.

13. The method of claim 11, wherein the DCI format is a first DCI format, and wherein the method further comprises:
configuring, for a user equipment (UE), the first DCI format, a second DCI format, and the power parameter set using radio resource control (RRC) signaling, wherein the multiple open loop power levels are configured for the power parameter set indicated by the SRI field due to the first DCI format having the SRI field and the second DCI format not having the SRI field.

14. The method of claim 11, wherein the indication of the single-bit indication field is 1.

15. The method of claim 11, wherein the single-bit indication field is an open loop power control parameter set indication field.

16. The method of claim 11, wherein receiving the PUSCH comprises:
receiving the PUSCH based at least in part on the DCI format including the SRI field.

17. A user equipment (UE) for wireless communication, comprising:
a memory; and
one or more processors coupled to the memory, the one or more processors configured to:
receive downlink control information (DCI) for a physical uplink shared channel (PUSCH), wherein the DCI includes an indication of an open loop power level associated with the PUSCH,
wherein the DCI includes a single-bit indication field for the open loop power level and a sounding reference signal resource indicator (SRI) field based at least in part on a DCI format of the DCI, and wherein the SRI field indicates a power parameter set including multiple open loop power levels;
determine a lowest-indexed power level of the multiple open loop power levels as the open loop power level based at least in part on the single-bit indication field and the SRI field, wherein the lowest-indexed power level is configured to be associated with a power level larger than another power level of the multiple open loop power levels; and
transmit on the PUSCH using the open loop power level.

18. The UE of claim 17, wherein the lowest-indexed power level is configured to be associated with a boosted power level.

19. The UE of claim 17, wherein the indication of the single-bit indication field is 1.

20. The UE of claim 17, wherein the single-bit indication field is an open loop power control parameter set indication field.

21. The UE of claim 17, wherein the multiple open loop power levels are configured for the power parameter set indicated by the SRI field due to the UE being configured with the DCI format with the SRI field and another DCI format without the SRI field.

22. The UE of claim 17, wherein the open loop power level is based at least in part on a preconfigured rule.

23. The UE of claim 22, wherein the preconfigured rule indicates to select the lowest-indexed power level, of the multiple open loop power levels, as the open loop power level used to transmit the PUSCH.

24. The UE of claim 17, wherein the DCI format is a first DCI format, and wherein the one or more processors are configured to:
receive configuration information from a network entity configuring the UE with the first DCI format and a second DCI format, wherein in the second DCI format, the DCI does not comprise the SRI field present in the first DCI format and the DCI comprises a two-bit indication field for the open loop power level.

25. The UE of claim 17, wherein to transmit on the PUSCH, the one or more processors are configured to:
transmit on the PUSCH using a transmit power that is based at least in part on an open loop power control formula, wherein the lowest-indexed power level is used as input to the open loop power control formula.

26. A network entity for wireless communication, comprising:
a memory; and
one or more processors coupled to the memory, the one or more processors configured to:
transmit, via downlink control information (DCI), scheduling information for a physical uplink shared channel (PUSCH), wherein the scheduling information indicates an indication of an open loop power level associated with the PUSCH,
wherein a DCI format of the DCI includes a single-bit indication field for the open loop power level and a sounding reference signal resource indicator (SRI) field, and wherein multiple open loop power levels are configured for a power parameter set indicated by the SRI field; and
receive on the PUSCH, wherein the open loop power level of the PUSCH uses a lowest-indexed power level of the multiple open loop power levels, and wherein the lowest-indexed power level is configured to be associated with a power level larger than another power level of the multiple open loop power levels.

27. The network entity of claim 26, wherein the one or more processors are configured to:
configure the lowest-indexed power level to be associated with a boosted power level.

28. The network entity of claim 26, wherein the one or more processors are configured to:
configure, for a user equipment (UE), a first DCI format, a second DCI format, and the power parameter set using radio resource control (RRC) signaling, wherein the multiple open loop power levels are configured for the power parameter set indicated by the SRI field due to the first DCI format having the SRI field and the second DCI format not having the SRI field.

29. The network entity of claim 26, wherein the single-bit indication field is an open loop power control parameter set indication field.

30. The network entity of claim 26, wherein to receive on the PUSCH, the one or more processors configured to:
receive on the PUSCH based at least in part on the DCI format including the SRI field.

* * * * *